US011292322B2

(12) United States Patent
Cohoon et al.

(10) Patent No.: US 11,292,322 B2
(45) Date of Patent: Apr. 5, 2022

(54) TONNEAU COVER SYSTEM WITH INSERT FOR SUPPORTING CROSS-BOW MEMBERS

(71) Applicant: Tectum Holdings, Inc., Ann Arbor, MI (US)

(72) Inventors: William Roy Cohoon, Brighton, MI (US); Mark Alan Hickey, Howell, MI (US)

(73) Assignee: TECTUM HOLDINGS, INC., Ann Arbor, MI (US)

( * ) Notice: Subject to any disclaimer, the term of this patent is extended or adjusted under 35 U.S.C. 154(b) by 71 days.

(21) Appl. No.: 16/907,974

(22) Filed: Jun. 22, 2020

(65) Prior Publication Data

US 2021/0394599 A1    Dec. 23, 2021

(51) Int. Cl.
| | |
|---|---|
| *B60J 7/19* | (2006.01) |
| *B60J 7/06* | (2006.01) |
| *B60J 7/10* | (2006.01) |
| *B60J 7/12* | (2006.01) |
| *B60J 7/04* | (2006.01) |
| *B60J 7/08* | (2006.01) |
| *B60J 10/30* | (2016.01) |
| *B60J 10/90* | (2016.01) |
| *B60J 11/02* | (2006.01) |
| *B60P 7/04* | (2006.01) |
| *A44B 18/00* | (2006.01) |
| *B60J 7/185* | (2006.01) |
| *B29L 31/00* | (2006.01) |

(52) U.S. Cl.
CPC .............. *B60J 7/067* (2013.01); *B60J 7/104* (2013.01); *B60J 7/1858* (2013.01); *B60J 10/30* (2016.02); *A44B 18/0011* (2013.01); *A44B 18/0015* (2013.01); *B29L 2031/729* (2013.01); *B60J 7/085* (2013.01); *B60J 7/10* (2013.01); *B60J 7/102* (2013.01); *B60J 7/12* (2013.01); *B60J 7/198* (2013.01); *B60J 10/90* (2016.02); *B60J 11/02* (2013.01); *B60P 7/04* (2013.01)

(58) Field of Classification Search
USPC ...... 296/98, 100.01, 100.03, 100.16, 100.17, 296/100.18
See application file for complete search history.

(56) References Cited

U.S. PATENT DOCUMENTS

| | | | |
|---|---|---|---|
| 5,121,960 A | 6/1992 | Wheatley | |
| 5,263,761 A | 11/1993 | Hathaway et al. | |
| 5,275,458 A | 1/1994 | Barben et al. | |
| 5,301,995 A | 4/1994 | Isler | |
| 5,460,423 A * | 10/1995 | Kersting | B60J 7/104 296/100.18 |
| 5,522,635 A | 6/1996 | Downey | |
| 5,851,047 A * | 12/1998 | Adams | B60P 7/04 296/100.18 |

(Continued)

*Primary Examiner* — Dennis H Pedder
*Assistant Examiner* — Joyce Eileen Hill
(74) *Attorney, Agent, or Firm* — The Dobrusin Law Firm, P.C.

(57) ABSTRACT

A frame rail assembly for supporting a tonneau cover comprising: opposing frame rails locatable on a cargo area of a vehicle, each of the opposing frame rails having one or more slots formed therein; and one or more inserts that fit within the one or more slots respectively; wherein the one or more inserts are shaped to fit substantially flush with a transverse cross-sectional profile of the opposing frame rails.

20 Claims, 5 Drawing Sheets

(56) References Cited

U.S. PATENT DOCUMENTS

| | | | |
|---|---|---|---|
| 6,053,558 | A | 4/2000 | Weldy et al. |
| 6,257,647 | B1 | 7/2001 | Ninnes et al. |
| 6,543,836 | B1 | 4/2003 | Wheatley |
| 6,976,724 | B2 | 12/2005 | Wheatley |
| 10,315,498 | B2 | 6/2019 | Parkey |
| 2007/0110539 | A1 | 5/2007 | Klinkman et al. |
| 2010/0327619 | A1* | 12/2010 | Schmeichel ............. B60J 11/00 24/442 |
| 2018/0194208 | A1* | 7/2018 | Binfet ....................... B60J 7/102 |
| 2020/0039337 | A1 | 2/2020 | Shi et al. |
| 2020/0215887 | A1* | 7/2020 | Spencer ............. A44B 18/0015 |

\* cited by examiner

US 11,292,322 B2

TONNEAU COVER SYSTEM WITH INSERT FOR SUPPORTING CROSS-BOW MEMBERS

FIELD

The present teachings generally relate to a tonneau cover system and more particularly a frame rail assembly for supporting a tonneau cover. The frame rail assembly may be particularly beneficial in preventing water and/or debris intrusion into a cargo area while supporting a low-profile tonneau cover.

BACKGROUND

Some tonneau covers are supported by cross-bow members that span across the cargo area of vehicles. Cross-bow members typically engage with frame rails mounted to opposing walls of a cargo area and are supported therefrom. Some cross-bow members require physical manipulation to install. Physical manipulation may include bending the cross-bow member while simultaneously aligning the cross-bow member into correct engagement with the frame rails. In addition, some frame rails that accept cross-bow members extend a distance above or below the cargo area or even extend into the cargo area to accommodate the cross-bow members.

Some consumers prefer tonneau covers that are low profile. Low profile covers may be substantially flat and extend minimally, if at all, above the walls of the cargo area. Low profile covers may be attractive to consumers as they are aesthetically pleasing. Structural modifications to achieve a low profile can risk introducing openings in frame rails, between the frame rails, or both along the tonneau cover. These openings may provide an entry point where water and/or debris may intrude and enter the cargo area.

It would be desirable to provide a tonneau cover system that utilizes cross-bow members while maintaining a low profile. It would be desirable to provide a tonneau cover system that obviates structural additions, for accommodating cross-bow members, that extend above or below the cargo area or that extend into the cargo area. It would be desirable to provide a tonneau cover system that provides for an easily formed and secure engagement of the cross-bow members to the frame rails while avoiding numerosity of parts and complexity of the assembly by consumers. It would be desirable to provide a tonneau cover system that prevents water and/or debris intrusion into the cargo area.

SUMMARY

The present disclosure relates to a frame rail assembly for supporting a tonneau cover, which may address at least some of the needs identified above, the frame rail assembly comprising: opposing frame rails locatable on a cargo area of a vehicle, each of the opposing frame rails having one or more slots formed therein; and one or more inserts that fit within the one or more slots respectively; wherein the one or more inserts are shaped to fit substantially flush with a transverse cross-sectional profile of the opposing frame rails.

The present disclosure relates to a tonneau cover system for a cargo area of a vehicle, which may address at least some of the needs identified above, the tonneau cover system comprising: opposing frame rails mountable on the cargo area of the vehicle, each of the opposing frame rails having one or more slots formed therein and the opposing frame rails comprising one or more inserts that fit within the one or more slots respectively; one or more cross-bow members extending from one of the opposing frame rails to another of the opposing frame rails; brackets coupled to opposing ends of the one or more cross-bow members, each of the brackets being removably engageable with the one or more inserts; and a tonneau cover supported by the opposing frame rails, the brackets, and the one or more cross-bow members; wherein the one or more inserts are shaped to fit substantially flush with a transverse cross-sectional profile of the opposing frame rails.

DETAILED DESCRIPTION

Figure 1:
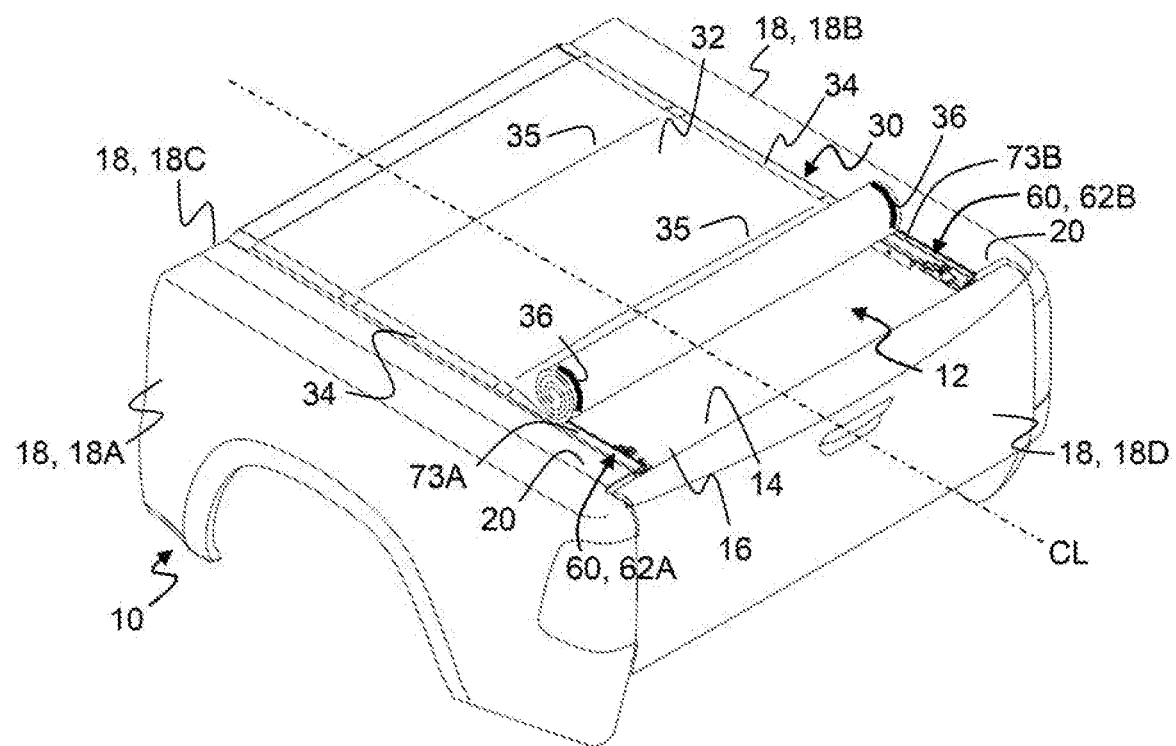
FIG. 1 is a perspective view of a portion of a vehicle.

The present teachings meet one or more of the above needs by the improved frame rail assembly and tonneau cover system described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present disclosure provides for a frame rail assembly for supporting a tonneau cover and a tonneau cover system for a cargo area of a vehicle. The tonneau cover and tonneau cover system may be used with almost any vehicle having a cargo area. A vehicle may include a car, truck, bus, train, cargo trailer, the like, or any combination thereof. In particular, trucks, such as pick-up trucks may include one or more cargo areas (i.e., bed) located to the rear of a passenger area (i.e., cab). The cargo area may be defined by a plurality of walls. The plurality of walls may include one or more side walls, a back wall (i.e., tailgate), a front wall, a bottom (i.e., floor), or any combination thereof. One or more walls may be opposing one or more other walls. One or more side walls may oppose one or more other side walls. A back wall may oppose a front wall. One or more walls may be adjacent to one or more other walls. One or more side walls may be adjacent to both the back wall and front wall. One or more walls may surround one or more other walls, be substantially perpendicular to one or more other walls, or both. One or more side walls, the front wall, back wall, or a combination thereof may surround a bottom and be substantially perpendicular to the bottom. A plurality of walls may define an open top, hollow cargo space area, or both. An open top may be located opposite the bottom. An open top, one or more walls, or both may provide access into the cargo area. The cargo area may be substantially symmetrically arranged along a centerline (i.e., longitudinal axis). The center line may be the same as the center line of the vehicle. The center line may extend from a back wall to a front wall. The cargo area may function to receive cargo. Cargo may include luggage, tools, sports equipment, other personal and/or professional belongings, the like, or any combination thereof. It may be desirable to cover the cargo area, such as for security and/or preventing intrusion of rain, wind, and blowing debris. A tonneau cover system may be used to cover the cargo area to provide such security and/or intrusion.

The vehicle may include a tonneau cover system. The tonneau cover system may function to cover the cargo area; prevent access into the cargo area; prevent intrusion of water, wind, debris, or any combination thereof into the cargo area; protect items stored in the cargo area; or any combination thereof. The tonneau cover may selectively engage with the frame rail assembly. The tonneau cover may selectively engage with the frame rails. The tonneau cover system may include a tonneau cover, one or more cross-bow members, one or more brackets, a frame rail assembly, one or more frame rails, one or more inserts, one or more frame rail fastening members, or any combination thereof. In order to prevent said intrusion, the tonneau cover may be securely fastened to frame rails locatable on the cargo area. The tonneau cover may be securely fastened along substantially the entire length of the frame rails.

The tonneau cover system may include a tonneau cover. The tonneau cover may function to selectively cover the cargo area; prevent intrusion of water, wind, debris, or any combination thereof into the cargo area; protect items stored in the cargo area; or any combination thereof. The tonneau cover may be any cover which is able to cover the cargo area, allow for items to be stored in the cargo area, or both. The tonneau cover may be a flexible, rigid, or both. The tonneau cover may be formed of a fabric, a unitary sheet, or both. The fabric may include woven fabric or non-woven fabric. The fabric, the unitary sheet, or both may comprise a polymer, an organic material, or both. The organic material may include cotton and/or the like. The polymer may include vinyl, polyester, the like, or any combination thereof. The tonneau cover may have a length, along the centerline, that is approximately equal to as the length of the cargo area, along the centerline. The tonneau cover may have a width, transverse to the center line, that is approximately equal to as the width of the cargo area, transverse to the centerline. The tonneau cover may span across and/or over the cargo area. The tonneau cover may be manipulated to selectively engage with the frame rails, selectively cover or un-cover the cargo area, or both. The tonneau cover may be manipulated to fold, un-fold, roll, un-roll, store, deploy, or any combination thereof. The tonneau cover may have a bottom side opposing a top side. The bottom side may face toward the floor (i.e., bottom) of the cargo area. The top side may be opposite the bottom side, face away from the floor of the cargo area, or both. The tonneau cover may include one or more edges. The one or more edges may be located around a portion or an entire perimeter of the tonneau cover. The one or more edges may engage with the frame rail assembly. The one or more edges may extend over the frame rail assembly, engage with the outwardly facing portion of the frame rail assembly, or both. The tonneau cover may be supported by the opposing frame rails, the brackets, the one or more cross-bow members, or any combination thereof. The tonneau cover may include one or more complementary fastening members, one or more attachment members, or both.

The tonneau cover may include one or more complementary fastening members. The one or more complementary fastening members may function to fasten to the frame rail assembly, retain the tonneau cover in engagement with the frame rail assembly, or both. The one or more complementary fastening members may be located on one or more edges of the tonneau cover. The one or more complementary fastening members may be located along a portion of or an entire length of the one or more edges of the tonneau cover. The one or more complementary fastening members may include one or more hook-and-loop, snaps, clips, the like, or any combination thereof. A suitable hook-and-loop type fastener may be Velcro®. A hook-and-loop fastener may be advantageous in providing a quick and easy method of attachment which is also secure. The complementary fastening member may be a hook-bearing material or a loop-bearing material. When the complementary fastening member is a loop-bearing material, the frame rail fastening member and/or the insert fastening member may be a hook-bearing material, or vice versa. The complementary fastening member may fasten to a fastening member on the frame rail assembly. For example, when the tonneau cover is deployed over the cargo area with opposing edges of the tonneau cover aligned over the frame rail assembly, the fastening member on the frame rails may contact the complementary fastening member on the edges of the tonneau cover and thereby form a secure and/or reversible attachment.

The tonneau cover may include one or more attachment members. The one or more attachment members may function to fasten one or more cross-bow members, one or more brackets, or both to the tonneau cover. The one or more attachment members may permanently or removably fasten the one or more cross-bow members, the one or more brackets, or both to the tonneau cover. The one or more attachment members may cause the one or more cross-bow members, the one or more brackets, or both to move with the tonneau cover when the tonneau cover is manipulated (e.g., folding, un-folding, rolling, un-rolling, storing, deploying). One or more attachment members may include a mechanical fastener, a chemical fastener, or both. The one or more mechanical fasteners may include straps, loops, ties, or any combination thereof. The one or more chemical fasteners may include epoxy, cyanoacrylates, urethane, or any combination thereof. The one or more mechanical fasteners may be affixed to the tonneau cover. The one or more mechanical fasteners may be mechanically and/or chemically affixed to the tonneau cover. Suitable mechanical fastening to the tonneau cover may include sewing and/or riveting. Suitable chemical fastening to the tonneau cover may include epoxy, cyanoacrylates, urethane, or any combination thereof. The one or more attachment members may be affixed to the bottom side of the tonneau cover. The one or more attachment members may engage the one or more cross-bow members and/or the one or more brackets at distal ends, generally middle portions, or anywhere therebetween. The one or more attachment members may be adapted to wrap around the one or more cross-bow members, the one or more brackets, or both. The one or more attachment members may be pairs of straps. Each of the straps may include fasteners. The fasteners may include one or more hook-and-loop, snaps, clips, the like, or any combination thereof. The pair of straps may wrap around the one or more cross-bow members, one strap over the other. The tension from the straps applied to the one or more cross-bow members, brackets, or both may cause the fasteners on each of the straps to come into contact and fasten the straps together. The one or more attachment members may be loops. The loops may be continuous loops. The loops may be formed of an elastic textile. The one or more cross-bow members may be inserted through the loops. The one or more attachment members may be pairs of ties. The pairs of ties may be adapted to wrap around the one or more cross-bow members. The ties may form a knot to fasten the ties together.

The tonneau cover system may include one or more cross-bow members. The one or more cross-bow members may function to support the tonneau cover, tension the tonneau cover, or both. The one or more cross-bow members may be curved, straight, or both. The one or more cross-bow members may have a unitary construction or comprise multiple segments. The one or more cross-bow members may comprise polymer, metal, or both. The polymer may be acrylonitrile butadiene styrene, polyvinyl chloride, nylon, polystyrene, polyethylene, polycarbonate, the like or any combination thereof. The metal may be aluminum, steel, titanium, brass, the like, or any combination thereof. The one or more cross-bow members may be extruded, drawn, molded, stamped, casted, or any combination thereof. For example, the one or more cross-bow members may be formed of a single metal (e.g., aluminum) extrusion. As another example, the one or more cross-bow members may be formed of an injection-molded polymer. The one or more cross-bow members may have a shaped cross-sectional profile along its longitudinal axis. The cross-sectional profile may be circular, ovoid, square, rectangular, the like, or a combination thereof. The one or more cross-bow members may be solid, hollow, or a combination of both (e.g., partially hollow). Being hollow may provide for reduced weight of the one or more cross-bow members. The one or more cross-bow members may extend between portions of the frame rail assembly. The one or more cross-bow members may extend from one of the frame rails to an opposing frame rail. The one or more cross-bow members may be suspended over the hollow cargo space area. The one or more cross-bow members may include opposing ends. The opposing ends may be longitudinally distal ends of the one or more cross-bow members. A distance from one end to an opposing end may define a length of a cross-bow member. A length of a cross-bow member may be approximately equal to, smaller than, or greater than, a width of a tonneau cover, cargo area, or both. One or more brackets may be located on the one or more cross-bow members. The one or more brackets may be coupled at one or more opposing ends of the one or more cross-bow members. The opposing ends may be located adjacent to the frame rail assembly when the tonneau cover is deployed over the cargo area. The one or more cross-bow members and/or the tension created thereby may or may not create an outward impression on the top side of the tonneau cover. The outward impression may prevent standing water on the tonneau cover; facilitate runoff of rainwater, melted snow, and/or debris; or any combination thereof so as to maintain an attractive appearance and prevent accelerated degradation of the tonneau cover. The outward impression may be flat, curved, or both.

The tonneau cover system may include one or more brackets. The one or more brackets may function to support the one or more cross-bow members on the frame rail assembly. The one or more brackets may be formed of metal, polymer, or any combination thereof. The polymer may be acrylonitrile butadiene styrene, polyvinyl chloride, nylon, polystyrene, polyethylene, polycarbonate, the like or any combination thereof. The metal may be aluminum, steel, titanium, brass, the like, or any combination thereof. The one or more brackets may be extruded, drawn, molded, stamped, casted, or any combination thereof. The one or more brackets may have a unitary construction or be comprised of multiple components. For example, the one or more brackets may be a unitary piece of injection molded polymer. The one or more brackets may have two ends. One end of the bracket may engage with the frame rail assembly (i.e., insert engaging portion) and the other end may engage with the one or more cross-bow members (i.e., cross-bow member engaging portion). The tonneau cover system may include two brackets for each of the cross-bow members. The one or more brackets may be coupled to one or more of the opposing ends of the one or more cross-bow members. The one or more brackets may engage with the one or more cross-bow members. The one or more brackets may be removably or permanently affixed to the one or more cross-bow members. The one or more brackets may engage with the one or more inserts. The one or more brackets may be removably supported by the one or more inserts. The one or more brackets may drop-in to engagement with the one or more inserts. The one or more brackets may include one or more cross-bow member engaging portions, one or more insert engaging portions, the like, or any combination thereof.

The one or more brackets may include a cross-bow member engaging portion. The cross-bow member engaging portion may function to engage with the one or more cross-bow members. The cross-bow member engaging portion may have a shaped longitudinal cross-sectional profile (e.g., circular, ovoid, square, or rectangular) that corresponds to the shaped longitudinal cross-sectional profile of the cross-bow members. The longitudinal cross-sectional profile may have a width. The cross-bow member engaging portion may have a width that is larger than, smaller than, or substantially equal to the width of the one or more cross-bow members. The cross-bow member engaging portion may be a female-type connector or a male-type connector. For example, the cross-bow member engaging portion may be a slot (i.e., female-type connector) adapted to accept and/or friction-fit with a cross-bow member. The cross-bow member engaging portion and the cross-bow member may be concentric when engaged. The cross-bow member engaging portion may extend along a length of the one or more cross-bow members from the distal ends toward a generally center portion of the one or more cross-bow members. Engagement of the one or more cross-bow members and the cross-bow member engaging portion may be permanent or removable. The engagement may include friction-fitting, threading, molding, or any combination thereof. For example, the cross-bow member may be removably friction-fit into the cross-bow member engaging portion. As another example, the cross-bow member may be removably threaded into the cross-bow member engaging portion. As yet another example, the cross-bow member engaging portion may be permanently, integrally molded to the cross-bow member thereby providing the cross-bow member and the bracket as a unitary construction.

The one or more brackets may include an insert engaging portion. The insert engaging portion may function to engage with the one or more inserts. The insert engaging portion may be a projection (i.e., "finger") extending from a longitudinally end the one or more brackets. The insert engaging portion may extend along a longitudinal axis of the one or more brackets and/or the one or more cross-bow members; extend along a distal longitudinal axis of the one or more brackets and/or the one or more cross-bow members; or both. The longitudinal axis may extend through the general center of the bracket and between the two ends of the bracket (i.e., the insert engaging portion and the cross-bow member engaging portion). The distal longitudinal axis may extend along a distal portion of the bracket and between the two ends of the bracket (i.e., the insert engaging portion and the cross-bow member engaging portion). The longitudinal extension of the insert engaging portion may provide for a portion of the one or more brackets, the one or more cross-bow members, or both to extend a distance above the insert and/or an outwardly facing surface of the one or more frame rails. The longitudinal extension of the insert engaging portion may provide for a portion of the one or more brackets, the one or more cross-bow members, or both to depend a distance below the insert and/or an outwardly facing surface of the one or more frame rails. The distal longitudinal extension of the insert engaging portion may provide for a portion of the one or more brackets, the one or more cross-bow members, or both to depend a distance below the insert and/or an outwardly facing surface of the one or more frame rails. The distal longitudinal extension of the insert engaging portion may prevent the one or more brackets, the one or more cross-bow members, or both from extending above a top surface of the one or more frame rails. The distal longitudinal extension of the insert engaging portion may provide for a low-profile appearance of the tonneau cover system. The insert engaging portion may include a top side and/or a bottom side. The bottom side may be generally flat. The bottom side may oppose the top side. The bottom side may engage with the insert. The top side may be generally flat. The top side may be angled. The top side may have an angle approximately equal to the angle of the sealing portion of the insert, the outwardly facing portion of the one or more frame rails, the channel of the one or more frame rails, or any combination thereof. The angle may be sufficiently small to provide for a low-profile tonneau cover assembly while also preventing intrusion of water, wind, debris, or any combination thereof into the cargo area. The angle may be about 10° or more, 15° or more, or even 20° or more from the top surfaces of the walls of the cargo area. The angle may be about 50° or less, 45° or less, or even 40° or less from the top surfaces of the walls of the cargo area. It may be understood that a larger angle may result in the insert engaging portion extending further above the walls and thereby diminishing the low-profile of the tonneau cover system. An angle of about 10° to about 20° (e.g., about 15°) may be particularly beneficial at maintaining sufficient prevention of intrusion of water, wind, debris, and the like while providing a low-profile. The top side may engage with the tonneau cover. The top side may provide for the tonneau cover to lay flat along both the top side of the insert engaging portion and the sealing portion of the insert. The insert engaging portion may be accepted by the one or more frame rails. The insert engaging portion may be accepted by an insert located within a slot formed in a frame rail. The insert engaging portion may be adapted for drop-in engagement, slide-in engagement, rock-in engagement, or any combination thereof with the insert.

The tonneau cover system may include a frame rail assembly. The frame rail assembly may function to support and/or fasten the tonneau cover, the one or more cross-bow members, the one or more brackets, or any combination thereof. The frame rail assembly may comprise one or more frame rails. The frame rail assembly may be mountable on the cargo area. The frame rail assembly may be mountable to top surfaces of the cargo area walls, downwardly extending lips of the cargo area walls, surfaces opposing the top surfaces of the cargo area, or any combination thereof. The frame rail assembly may be permanently or removably attached to the cargo area. The frame rail assembly may be attached to the cargo area by mechanical fasteners. The mechanical fasteners may include bolts, rivets, screws, clamps (e.g., C-clamps), or any combination thereof. For example, the frame rail assembly may be bolted onto the top surfaces of the walls of the cargo area via holes pre-formed in the walls. As another example, the frame rail assembly may be clamped, by one or more C-clamps, to a downwardly extending lip of the cargo area walls. The frame rail assembly may extend over the top surfaces of the walls, depend below the top surfaces of the walls, extend below the downwardly extending lip of the walls, extend below a surface of the walls opposing the top surfaces, or any combination thereof. The frame rail assembly may support one or more cross-bow members extending from one of the opposing frame rails to another of the opposing frame rails. The frame rail assembly may include one or more frame rails, one or more outwardly facing portions, one or more under-rail portions, one or more depending portions, one or more slots, one or more insert retaining features, one or more inserts, or any combination thereof.

The frame rail assembly may include one or more frame rails. The one or more frame rails may function to support and/or fasten the tonneau cover, the one or more cross-bow members, the one or more brackets, or any combination thereof. The one or more frame rails may be elongate members. The one or more frame rails may have a shape substantially complementary, reciprocal, or both with one or more walls, surfaces, or both of a cargo area. The one or more frame rails may be generally straight along their longitudinal axis. The longitudinal axis of the one or more frame rails may be generally parallel to the centerline of the vehicle. The one or more frame rails may be of generally unitary construction or be comprised of multiple components. The one or more frame rails may comprise aluminum, steel, titanium, brass, the like, or any combination thereof. The one or more frame rails may be formed by extrusion, molding, casting, stamping, drawing, or any combination thereof. The one or more frame rails may include a left-side frame rail (i.e., "driver's side frame rail"), a right-side frame rail (i.e., "passenger's side frame rail"), a cab adjacent frame rail, or any combination thereof. The frame rails may be located on opposing walls of the cargo area. The frame rails may be located on the right-side frame rail, the left-side frame rail, or both. The frame rails may be located on adjacent walls of the cargo area. The frame rails may be located on the cab adjacent frame rail and the right-side frame rail, the cab adjacent frame rail and the left-side frame rail, or any combination thereof. The one or more frame rails may extend along the entire length of the cargo area walls or along a portion thereof. The one or more frame rails may be attached to the walls of the cargo area. The one or more frame rails may be permanently or removably attached to the cargo area. The one or more frame rails may be attached to the cargo area by mechanical fasteners. The mechanical fasteners may include bolts, rivets, screws, clamps (e.g., C-clamps), or any combination thereof. The tonneau cover may be permanently or removably fastened to one or more frame rails. For example, the tonneau cover may be permanently or removably fastened to a frame rail adjacent to the cab (e.g., cab adjacent frame rail). The tonneau cover may be fastened to the cab adjacent frame rail and/or the side rails during storage and/or deployment. The one or more frame rails may be attached to the cab adjacent frame rail and/or the side rails by mechanical fasteners. The mechanical fasteners may include bolts, rivets, screws, clamps (e.g., C-clamps), or any combination thereof. The tonneau cover may be rolled or folded toward the cab adjacent frame rail to store the tonneau cover. The one or more frame rails may have one or more slots formed therein. The one or more frame rails may accept one or more inserts in the one or more slots respectively. The one or more frame rails may include an outwardly facing portion, an under-rail portion, a depending portion, or any combination thereof.

The one or more frame rails may include one or more under-rail portions. The one or more under-rail portions may function to support and/or retain the one or more frame rails on the one or more walls of the cargo area. The one or more under-rail portions may be elongate members. The one or more under-rail portions may be generally straight along a longitudinal axis. The one or more under-rail portions may be of generally unitary construction or be comprised of multiple components. The one or more under-rail portions may comprise aluminum, steel, titanium, brass, the like, or any combination thereof. The one or more under-rail portions may be formed by extrusion, molding, casting, stamping, drawing, or any combination thereof. The one or more under-rail portions may include a left-side under-rail portion, a right-side under-rail portion, a cab adjacent under-rail portion, or any combination thereof. The one or more under-rail portions may be located within the cargo area. The one or more under-rail portions may engage with a surface of the one or more walls opposing the top surface. The outwardly facing portion and the under-rail portion may brace against opposing surfaces of the walls thereby clamping onto the walls.

The one or more frame rails may include one or more depending portions. The one or more depending portions may function to connect the one or more outwardly facing portions to the one or more under-rail portions. The one or more depending portions may be elongate members. The one or more depending portions may be generally straight along their longitudinal axis. The longitudinal axis of the one or more one or more depending portions may be generally parallel to the centerline of the vehicle. The one or more depending portions may be of generally unitary construction or be comprised of multiple components. The one or more depending portions may comprise aluminum, steel, titanium, brass, the like, or any combination thereof. The one or more depending portions may be formed by extrusion, molding, casting, stamping, drawing, or any combination thereof. The one or more depending portions may include a left-side depending portion, a right-side depending portion, a cab adjacent depending portion, or any combination thereof. The one or more depending portions may extend downward from the outwardly facing portion. The one or more depending portions may be integrally molded to the outwardly facing portion, the under-rail portion, or both; or the one or more depending portions may be a unitary member. The one or more depending portions may permanently or removably fasten to the outwardly facing portion, the under-rail portion, or both. The one or more depending portions may be fastened to the outwardly facing portion, the under-rail portion, or both by a mechanical fastener. The mechanical fastener may include bolts, rivets, screws, or any combination thereof.

The one or more frame rails may include one or more outwardly facing portions. The one or more outwardly facing portions may function to support the one or more frame rails on top of the walls of the cargo area. The one or more outwardly facing portions may be generally straight along a longitudinal axis. The one or more outwardly facing portions may be of generally unitary construction or be comprised of multiple components. The one or more outwardly facing portions may comprise aluminum, steel, titanium, brass, the like, or any combination thereof. The one or more outwardly facing portions may be formed by extrusion, molding, casting, stamping, drawing, or any combination thereof. The one or more outwardly facing portions may include a left-side depending portion, a right-side depending portion, a cab adjacent depending portion, or any combination thereof. The one or more outwardly facing portions may include a bottom surface, a top surface, an inner surface, or any combination thereof. The bottom surface may rest upon the walls of the cargo area. The bottom surface may be generally flat. The top surface may oppose the bottom surface. The top surface may be generally parallel to the top surface of the walls. The top surface may face away from the centerline of the vehicle. The top surface may be arranged at an angle with respect to the top surfaces of the one or more walls. The angle may be generally equal to the angle of the top side of the insert engaging portion, the one or more channels, the sealing portion, or any combination thereof. The angle may be sufficiently small to provide for a low-profile tonneau cover assembly while also preventing intrusion of water, wind, debris, or any combination thereof into the cargo area. The angle may be about 10° or more, 15° or more, or even 20° or more from the top surfaces of the walls of the cargo area. The angle may be about 50° or less, 45° or less, or even 40° or less from the top surfaces of the walls of the cargo area. It may be understood that a larger angle may result in the outwardly facing portion extending further above the walls and thereby diminishing the low-profile of the tonneau cover system. An angle of about 10° to about 20° (e.g., about 15°) may be particularly beneficial at maintaining sufficient prevention of intrusion of water, wind, debris, and the like while providing a low-profile. The inner surface may face the cargo area. The one or more outwardly facing portions may have a transverse cross-sectional profile that is substantially uniform along the length of the one or more frame rails and at least partially defined by the top surface, the bottom surface, and the inner surface. The top surface or at least a portion thereof may be defined by the one or more channels. The one or more outwardly facing portions may be locatable on top surfaces of the walls. The one or more outwardly facing portions may be fastened to the top surfaces of the walls. The one or more outwardly facing portions may be fastened to the top surfaces of the walls by a mechanical fastener. The mechanical fastener may include bolts, rivets, screws, or any combination thereof. The outwardly facing portion may include one or more channels, one or more slots, one or more insert retaining features, one or more inserts, or any combination thereof.

The one or more frame rails may include one or more channels. The one or more channels may function to accept and/or retain one or more fastening members. The one or more channels may be formed on the outwardly facing portion of the one or more frame rails. The one or more channels may include one or more curved surfaces. The one or more curved surfaces may be projections extending from the outwardly facing portion. The one or more curved surfaces my extend orthogonal or at an angle from the outwardly facing portion. The projections may extend away from the top surface of the walls. The one or more curved surfaces may be located on opposing sides of the outwardly facing portion. The opposing curved surfaces may curve toward each other. The one or more channels may extend along the length of the one or more frame rails or a portion thereof. The one or more frame rails may be free of the one or more channels where one or more slots are located. The one or more channels may be capped by end caps, the one or more inserts, or both. For example, the one or more channels may be capped by one or more support walls of the one or more inserts at the interface of the one or more channels and the one or more slots. The one or more channels may be parallel to the top surface of the walls. The one or more channels may face away from the centerline of the vehicle. The one or more channels may be arranged at an angle with respect to the top surfaces of the one or more walls. The angle may be generally equal to the angle of the outwardly facing portion, the sealing portion, the top surface of the insert engaging portion, or any combination thereof. The angle may be sufficiently small to provide for a low-profile tonneau cover assembly while also preventing intrusion of water, wind, debris, or any combination thereof into the cargo area. The angle may be about 10° or more, 15° or more, or even 20° or more from the top surfaces of the walls of the cargo area. The angle may be about 50° or less, 45° or less, or even 40° or less from the top surfaces of the walls of the cargo area. It may be understood that a larger angle may result in the frame rails extending further above the walls and thereby diminishing the low-profile of the tonneau cover system. An angle of about 10° to about 20° (e.g., about) 15° may be particularly beneficial at maintaining sufficient prevention of intrusion of water, wind, debris, and the like while providing a low-profile. The one or more channels may include a frame rail fastening member.

The one or more channels may include one or more frame rail fastening members. The one or more frame rail fastening members may function to retain the tonneau cover in engagement with the frame rail assembly. The one or more frame rail fastening members may be located within the one or more channels. The one or more frame rail fastening members may be a mechanical fastener. The mechanical fastener may include a hook-and-loop type fastener, a snap, a clip, the like, or any combination thereof. The hook-and-loop type fastener may be Velcro®. The one or more frame rail fastening members may be a loop-bearing material or a hook-bearing material. When the one or more frame rail fastening members are a hook-bearing material, the complementary fastening member may be a loop-bearing material, or vice versa. The one or more frame rail fastening members may selectively engage with the complementary fastening member on the tonneau cover. For example, when the cover is deployed over the cargo area of the vehicle with opposing edges of the tonneau cover located on the frame rails, one or more frame rail fastening members may engage with the complementary fastening member and thereby form a secure and reversible attachment therewith. The one or more frame rail fastening members may be coupled to an elongated slat. An exemplary elongated slat may be found in U.S. Pat. No. 7,445,264, which is incorporated by reference. The one or more frame rail fastening members may be affixed to the elongated slat by a mechanical fastener, a chemical fastener, or both. The one or more mechanical fasteners may be bolts, rivets, screws, or any combination thereof. The one or more chemical fasteners may be epoxy, cyanoacrylates, urethane, or any combination thereof. The one or more frame rail fastening members may be integrally molded on the elongated slat. The elongated slat may be adapted to be accepted by the channel. The elongated slat may be adapted to slide within the channel. The elongated slat may be affixed to the outwardly facing portion by a mechanical fastener, a chemical fastener, or both. The one or more mechanical fasteners may be bolts, rivets, screws, or any combination thereof. The one or more chemical fasteners may be epoxy, cyanoacrylates, urethane, or any combination thereof. The elongated slat may be rigid or flexible. Rigidity may prevent the elongated slat from being removed from the channel from between the one or more curved surfaces.

The one or more frame rails may include one or more slots. The one or more slots may function to accept and/or retain one or more inserts. The one or more slots may be formed in one or more locations along the length of the one or more frame rails. The one or more slots may be formed on opposing frame rails at corresponding locations. The one or more frame rails may include a number of the one or more slots corresponding to the number of cross-bow members and/or the number of inserts utilized in the tonneau cover system. For example, there may be two slots for one cross-bow member, one on each opposing frame rail. The one or more slots may be machined into the one or more frame rails or molded into the one or more frame rails. The one or more slots may be an absence of at least a portion of the transverse cross-sectional profile of the one or more frame rails. At least part of the one or more frame rails may remain intact along the entire length of the one or more frame rails, so the one or more frame rails remain of unitary construction. The one or more slots may extend longitudinally along a length of the one or more frame rails. The length of the one or more slots may be generally equal to or smaller than the length of the one or more inserts. The one or more slots may extend completely or partially transversely along a width of the one or more frame rails. The width of the one or more slots may be generally equal to or smaller than the width of the one or more inserts. The one or more slots may be generally a quadrilateral prism in shape. The quadrilateral may include a cuboid, a rectangular prism, a trapezoidal prism, the like, or any combination thereof. The one or more slots may be adapted to accept one or more inserts, one or more brackets, one or more cross-bow members, or any combination thereof.

The one or more frame rails may include one or more insert retaining features. The one or more insert retaining features may function to engage with the one or more inserts, obviate axial movement of the insert with respect to the frame rail, aid in the correct positioning of the one or more inserts within the one or more slots, or any combination thereof. In some aspects, the one or more insert retaining features may be a projection extending from the one or more frame rails. For example, the one or more insert retaining features may be a rectangular projection extending into the one or more slots and adapted to be accepted by a rectangular groove (i.e., rail engagement feature) formed in the one or more inserts. In other aspects, the one or more insert retaining features may be a groove formed in the one or more frame rails. For example, the one or more insert retaining features may be a rectangular groove formed in the one or more frame rails and adapted to accept a rectangular projection (i.e., rail engagement feature) extending from the one or more inserts. The one or more insert retaining features may be formed by molding, casting, stamping, drawing, or any combination thereof. For example, the one or more insert retaining features may be formed on the one or more frame rails by extrusion and accordingly may extend along the length of the one or more frame rails. The one or more insert retaining features may accept or be accepted by the one or more inserts.

The one or more frame rails may include one or more inserts. The one or more inserts may function to engage with the one or more brackets, guide the positioning of the one or more brackets, fasten the tonneau cover, or any combination thereof. The one or more inserts may have a length along a longitudinal axis that is parallel to the longitudinal axis of the one or more frame rails. The one or more inserts may have a width along a transverse axis that is parallel to the transverse axis of the one or more frame rails. The one or more inserts may have a length generally equal to or greater than the length of the one or more slots. The one or more inserts may have a width generally equal to or less than the width of the one or more slots, the one or more frame rails, or both. The one or more inserts may fit substantially flush with or extend above or below a top surface of the frame rail, an inner surface of the frame rail, or both. A substantially flush fit may be particularly beneficial in providing a low-profile tonneau cover system while obviating intrusion of water and/or debris into the cargo area. The one or more inserts may fit substantially flush with the transverse cross-sectional profile of the one or more frame rails. The one or more inserts may comprise polymer, metal, or both. The polymer may be acrylonitrile butadiene styrene, polyvinyl chloride, nylon, polystyrene, polyethylene, polycarbonate, the like or any combination thereof. The metal may be aluminum, steel, titanium, brass, the like, or any combination thereof. The one or more inserts may be formed by extrusion, injection molding, casting, or any combination thereof. The one or more inserts may fit within the one or more slots. In some aspects, the one or more inserts may be integrally formed on the one or more frame rails thereby making the one or more inserts and the one or more frame rails a unitary construction. The one or more inserts may engage with the tonneau cover. The one or more inserts may support the one or more brackets, the one or more cross-bow members, or both. The one or more inserts may comprise a sealing portion, a bracket engaging portion, one or more support walls, one or more locking members, one or more rail engagement features, or any combination thereof.

The one or more inserts may include a sealing portion. The sealing portion may function to engage with and/or fasten to the tonneau cover to prevent water and/or debris intrusion between the tonneau cover and the one or more inserts. The sealing portion may have a length along a longitudinal axis that is parallel to the longitudinal axis of the one or more frame rails. The sealing portion may have a width along a transverse axis that is parallel to the transverse axis of the one or more frame rails. The sealing portion may have a length generally equal to or less than the length of the one or more inserts. The sealing portion may have a width generally equal to or less than the width of the one or more inserts, the one or more frame rails, or both. The sealing portion may be positioned distal from the cargo area. The sealing portion may be positioned adjacent to the bracket engaging portion. The sealing portion may be generally flat. The sealing portion may be substantially flush with or located below the top surface of the one or more frame rails. The sealing portion may face away from the centerline of the vehicle. The sealing portion may generally face away from a top surface of the wall. The sealing portion may be arranged at an angle with respect to the top surfaces of the one or more walls of the cargo area. The angle may be generally equal to the angle of the outwardly facing portion, the one or more channels, the top side of the insert engaging portion, or any combination thereof. The angle of the sealing portion may be positioned at an angle that is the same as or different from the angle of the one or more channels. The angle may be about 10° or more, 15° or more, or even 20° or more from the top surfaces of the walls of the cargo area. The angle may be about 50° or less, 45° or less, or even 40° or less from the top surfaces of the walls of the cargo area. It may be understood that a larger angle may result in the sealing portion extending further above the walls and thereby diminishing the low-profile of the tonneau cover system. An angle of about 10° to about 20° (e.g., about) 15° may be particularly beneficial at maintaining sufficient prevention of intrusion of water, wind, debris, and the like while providing a low-profile. The sealing portion may engage with the tonneau cover. The sealing portion may include an insert fastening member.

The sealing portion may include an insert fastening member. The insert fastening member may function to retain the tonneau cover in engagement with the frame rail assembly. The insert fastening member may be a hook-and-loop, a snap, a clip, the like, or any combination thereof. The hook-and-loop type fastener may be Velcro®. The insert fastening member may be the same type of fastener as the frame rail fastening member. The insert fastening member may be a hook-bearing material or a loop-bearing material. When the insert fastening member is a hook-bearing material, the complementary fastening member may be a loop-bearing material, or vice versa. The insert fastening member may span the length of the one or more slots or a portion thereof. The insert fastening member may be affixed to the sealing portion by a mechanical fastener, a chemical fastener, or both. The one or more mechanical fasteners may be bolts, rivets, screws, or any combination thereof. The one or more chemical fasteners may be epoxy, cyanoacrylates, urethane, or any combination thereof. The insert fastening member may be integrally molded onto the sealing portion. The insert fastening member may selectively engage with the complementary fastening member on the tonneau cover. For example, when the cover is deployed over the cargo area of the vehicle with opposing edges of the tonneau cover aligned on the frame rails, the insert fastening member may engage with the complementary fastening member located on an edge of the tonneau cover and thereby form a secure and reversible attachment therewith.

The one or more inserts may include a bracket engaging portion. The bracket engaging portion may function to engage with the one or more brackets. The bracket engaging portion may have a length along a longitudinal axis that is parallel to the longitudinal axis of the one or more frame rails. The bracket engaging portion may have a width along a transverse axis that is parallel to the transverse axis of the one or more frame rails. The bracket engaging portion may have a length generally equal to or less than the length of the one or more inserts. The bracket engaging portion may have a width generally equal to or less than the width of the one or more inserts, the one or more frame rails, or both. The bracket engaging portion may be generally flat. The bracket engaging portion may be a shelf upon which the insert engaging portion of the bracket is supported. The bracket engaging portion may be substantially parallel to the top surface of the walls. The bracket engaging portion may be positioned adjacent to the cargo area, the sealing portion, or both. The bracket engaging portion may be positioned between the sealing portion and the cargo area. The bracket engaging portion may be distanced below or substantially flush with a top surface of the opposing frame rails. Offsetting the bracket engaging portion below the top surface of the opposing frame rails may provide for a substantially flush fit of an insert engaging portion of the brackets with the top surface of the opposing frame rails when the brackets are engaged with the one or more inserts. The bracket engaging portion may be distanced below the sealing portion or a portion thereof. The bracket engaging portion of the insert may be wider than the insert engaging portion of the bracket. There may be one or more gaps between the longitudinal ends of the insert and the insert engaging portion of the bracket. The one or more gaps may function to provide for a tolerance for fitting the insert engaging portion with the bracket engaging portion. For example, the tonneau cover may contract in cold weather and expand in hot weather, which may affect the location of the insert engaging portion with respect to the bracket engaging portion. The one or more gaps may be located between the insert engaging portion and longitudinal ends of the one or more inserts. One or more gaps on opposing sides of the insert engaging portion of the bracket may be generally equal or one of the gaps may be larger than the other gap.

The one or more inserts may include one or more support walls. The one or more support walls may function to engage the one or more frame rails, retain the one or more inserts in the one or more slots, obviate longitudinal movement of the bracket, or any combination thereof. The one or more support walls may be located at one or both of opposing longitudinal ends of the one or more inserts. The one or more support walls may extend along the sealing portion, the bracket engaging portion, or both. The one or more support walls may be integrally molded to the sealing portion, bracket engaging portion, or both. The one or more support walls may be generally flush with the top surface of the outwardly facing portion, an inner surface of the outwardly facing portion, or both. The one or more support walls may friction-fit and/or fastened with mechanical and/or chemical fasteners with the one or more frame rails. The mechanical fasteners may include bolts, rivets, screws, or any combination thereof. The chemical fasteners may include epoxy, cyanoacrylates, urethane, or any combination thereof. The one or more support walls may cap the one or more frame rails. The one or more support walls may seal the one or more frame rails. The one or more support walls may engage with the tonneau cover.

The one or more inserts may include one or more locking members. The one or more locking members may function to retain the one or more inserts in the one or more frame rails, prevent axial movement of the one or more inserts with respect to the one or more frame rails, or both. The one or more locking members may be an elongate projection (e.g., a tab). The one or more locking members may extend from one or more longitudinal ends of the one or more inserts, one or more support walls of the one or more inserts, or both. The one or more locking members may extend toward the one or more frame rails. The one or more locking members may be integrally molded to the one or more inserts. The one or more locking members may be adapted to snap-fit with the one or more frame rails.

The one or more inserts may include one or more rail engagement features. The one or more rail engagement features may function to engage with the insert retaining feature, obviate transverse axial movement of the insert with respect to the one or more frame rails, aid in the correct positioning of the one or more inserts within the one or more slots, or any combination thereof. The one or more rail engagement features may extend along the length of the one or more inserts or a portion thereof. The one or more rail engagement features may extend along a width of the one or more inserts or a portion thereof. The one or more rail engagement features may be on a side of the one or more inserts opposing the sealing portion, the bracket engaging portion, or both. The one or more rail engagement features may be adapted to face the one or more slots, the one or more walls, or both. The one or more rail engagement features may be integrally molded on or into the one or more inserts. The one or more rail engagement features may be a projection extending from the one or more inserts or a groove formed in the one or more inserts. For example, the one or more rail engagement features may be a rectangular projection extending into the one or more frame rails and adapted to be accepted by a rectangular groove (i.e., insert retaining feature) in the one or more frame rails. As another example, the one or more rail engagement features may be a rectangular groove formed in the one or more inserts and a projection (i.e., insert retaining feature) extending from the one or more frame rails may be adapted to fit within the groove. The one or more rail engagement features may accept or be accepted by the one or more frame rails.

DETAILED DESCRIPTION OF THE DRAWINGS

FIG. 1 shows a perspective view of a vehicle 10. The vehicle 10 includes a cargo area 12 defined by walls 18. The cargo area 12 extends along a longitudinal axis or centerline CL of the vehicle 10. The walls 18 include a right-side side wall 18A (i.e., "side wall") and an opposing left-side side wall 18B (i.e., "side wall"); a front wall 18C (i.e., "cab wall"); and a backwall 18D (i.e., "tailgate") opposing the front wall 18C. The right-side side wall 18A and the opposing left-side side wall 18B include top surfaces 20. The cargo area 12 has a bottom (i.e., "floor") 14 and an opposing open top 16 that can be selectively covered with a tonneau cover 32.

Figure 2:
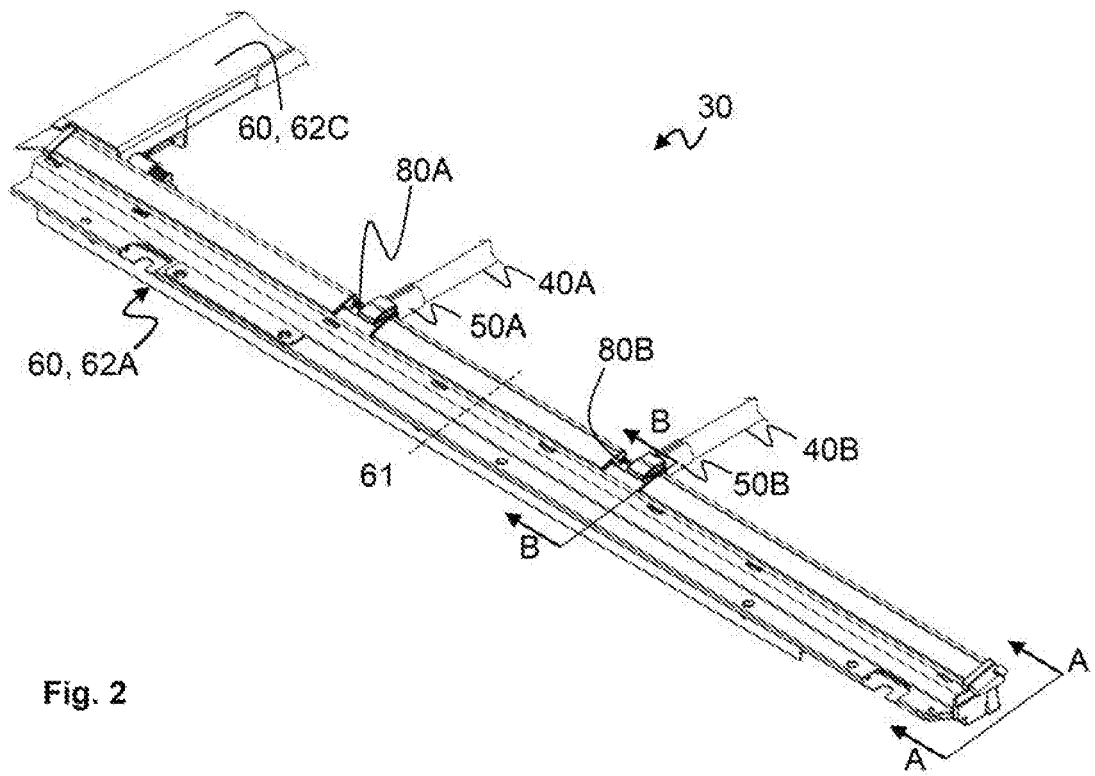
FIG. 2 is a perspective view of a portion of a tonneau cover system.

The cargo area 12 includes a frame rail assembly 60 installed thereon. The frame rail assembly 60 includes a frame rail 62A located on and/or attached to the right-side side wall 18A and a frame rail 62B located on and/or attached to the wall 18B. The frame rails 62A, 62B extend the length of the cargo area 12, from the wall 18C to the wall 18D. The tonneau cover 32 is supported by two cross-bow members 40A, 40B, as shown in FIG. 2. Tension of the tonneau cover 32 over the two cross-bow members 40A, 40B creates outward impressions 35 in the tonneau cover 32. A frame rail fastening member (e.g., hook-bearing material) 73A, 73B is located on each of the frame rails 62A, 62B and extends along the length of the frame rails 62A, 62B from the wall 18C to the wall 18D. The tonneau cover 32 includes a complementary fastening member (e.g., loop-bearing material) 36 located along the opposing edges 34 of the tonneau cover 32 and extending along the length of the tonneau cover 32. The tonneau cover 32 can be manipulated (e.g., folding, un-folding, rolling, un-rolling, storing, deploying) to selectively engage with the frame rails 62A, 62B and cover the open top 16 of the cargo area 12. Selective engagement of the tonneau cover 32 with the frame rails 62A, 62B causes selective fastening of the tonneau cover's 32 complementary fastening member 36 with the frame rail fastening member 73A, 73B of the frame rails 62A, 62B.

FIG. 2 shows a perspective view of a tonneau cover system 30. The tonneau cover system 30 includes a frame rail assembly 60, cross-bow members 40A, 40B, and brackets 50A, 50B. The frame rail assembly 60 includes a frame rail 62A associated with the right-side side wall 18A and a frame rail 62C associated with the wall 18C, as shown in FIG. 1. The cross-bow members 40A, 40B extend between the frame rails 62A, 62B, as shown in FIG. 1. The frame rails 62A, 62B include inserts 80A, 80B installed therein.

The cross-bow members 40A, 40B have brackets 50A, 50B coupled thereto. The brackets 50A, 50B are accepted by inserts 80A, 80B and support the cross-bow members 40A, 40B on the frame rails 62A, 62B, as shown in FIG. 1. The brackets 50A, 50B extend into the frame rail 62A along a transverse axis 61 of the frame rail 62A.

Figure 3:
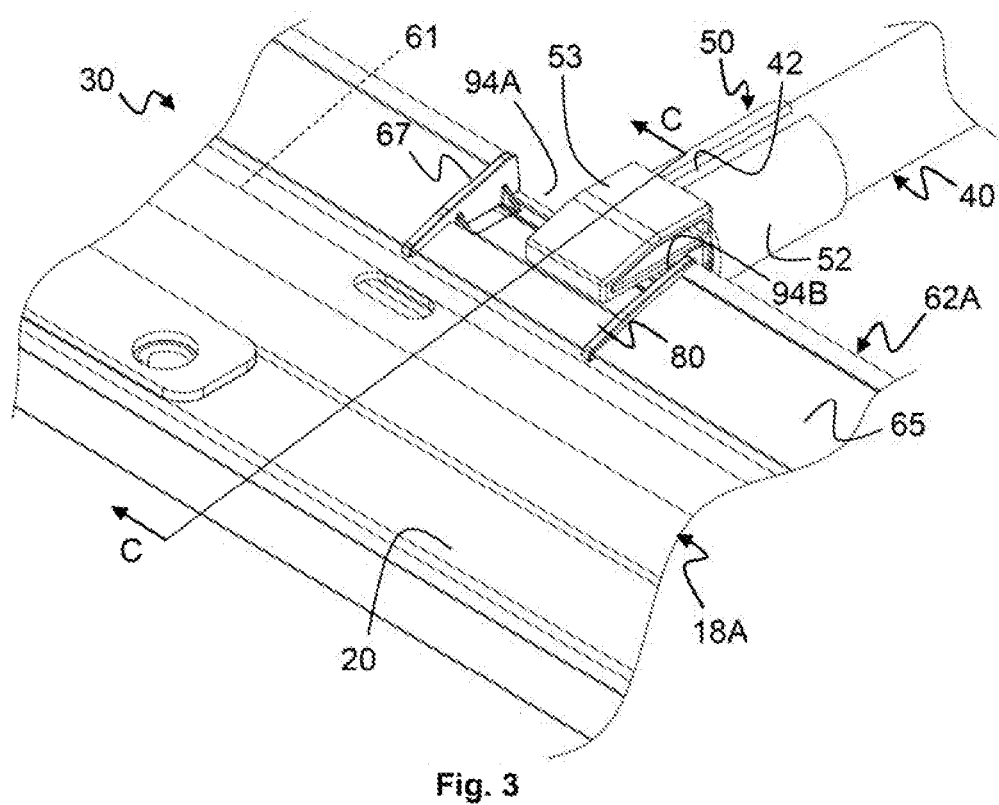
FIG. 3 is a perspective view of a portion of a tonneau cover system.

FIG. 3 shows a perspective view of a tonneau cover system 30. The tonneau cover system 30 includes a frame rail 62A, a cross-bow member 40, and a bracket 50. The frame rail 62A is installed on a right-side side wall 18A. An outwardly facing portion 65 of the frame rail 62A sits atop the top surface 20 of a right-side side wall 18A.

Figure 7:
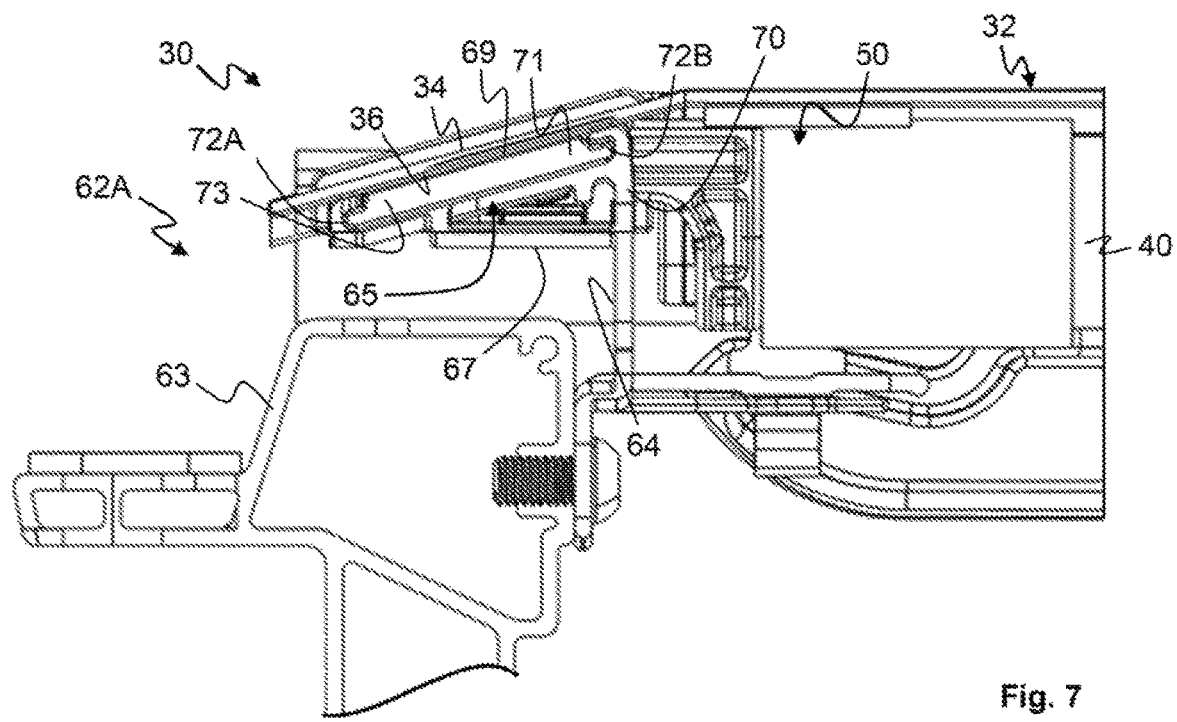
FIG. 7 is a cross-section view of the tonneau cover system along the line A-A, as shown in FIG. 2.

The frame rail 62A includes a slot 67 formed therein extending along a transverse axis 61 of the frame rail 62A. An insert 80 is located within the slot 67. The insert 80 is shaped to fit substantially flush with a top surface 69 of the frame rail 62A and an inner surface 70 of the frame rail 62B, as shown in FIG. 7.

The cross-bow member 40 has a bracket 50 coupled thereto. The bracket 50 includes a cross-bow member engaging portion 52 coupled to the cross-bow member 40. An opposing end 42 of the cross-bow member 40 is a male-type connector which fits into the cross-bow member engaging portion 52, which is a female-type connector. The bracket 50 includes an insert engaging portion 53, which is accepted by the insert 80. The cross-bow member 40 is supported on a frame rail 62A by the engagement of the bracket 50 with the insert 80. Gaps 94A, 94B are located between the insert 80 and the insert engaging portion 53. The gaps 94A, 94B provide for a tolerance for the fit of the insert engaging portion 53 with the insert 80. For instance, the tonneau cover 32 may contract in cold weather and expand in hot weather, which affects the location of the insert engaging portion 53 within the insert 80.

Figure 4:
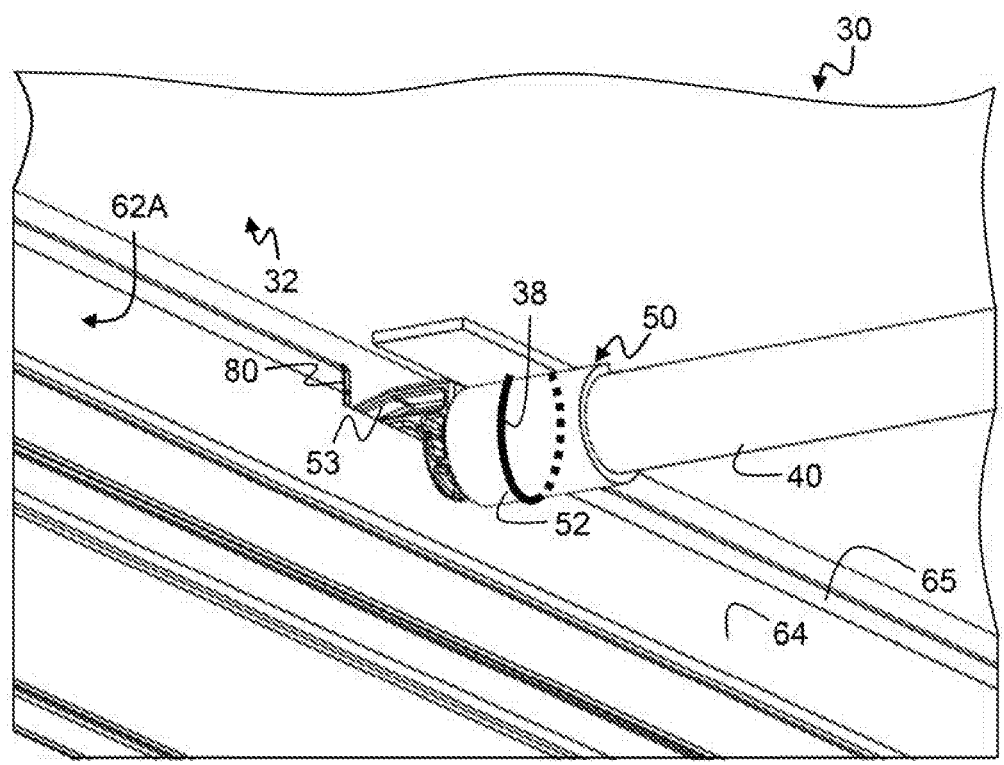
FIG. 4 is a perspective view of a portion of a tonneau cover system.

FIG. 4 shows a perspective view of a tonneau cover system 30. The tonneau cover system 30 includes a frame rail 62A, a cross-bow member 40, a bracket 50, and a tonneau cover 32. The frame rail 62A includes an outwardly facing portion 65 and a depending portion 64.

The cross-bow member 40 has a bracket 50 coupled thereto. The bracket 50 includes a cross-bow member engaging portion 52 coupled to the cross-bow member 40 and an insert engaging portion 53 extending into and engaging with an insert 80. The cross-bow member 40 is supported on a frame rail 62A by the engagement of the bracket 50 with the insert 80.

The tonneau cover 32 includes an attachment member 38 affixed thereto adjacent to the bracket 50. The attachment member 38 is wrapped around the bracket 50 thereby affixing the cross-bow member 40 to the tonneau cover 32.

Figure 5:
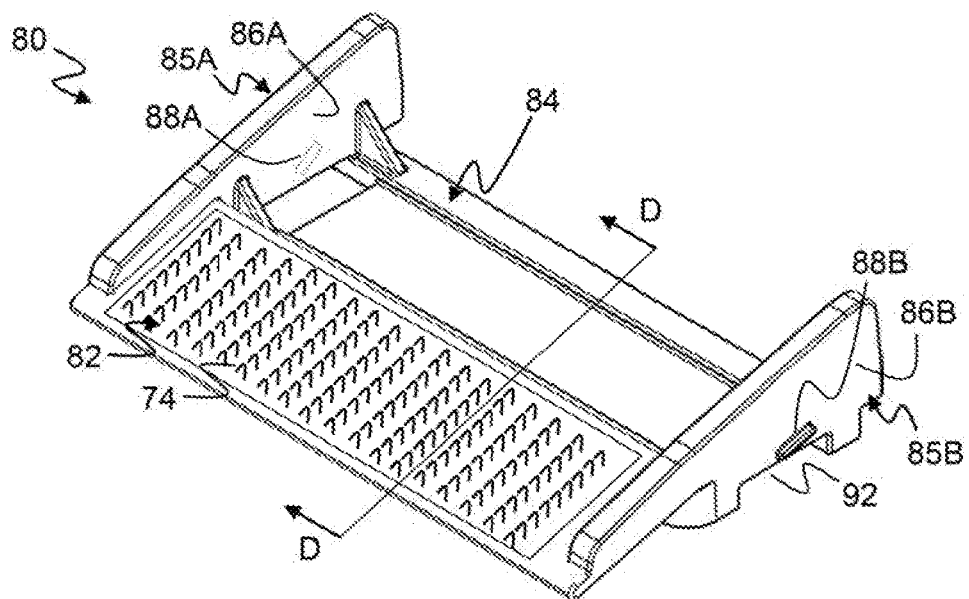
FIG. 5 is a perspective view of an insert.

FIG. 5 shows a perspective view of an insert 80. The insert 80 includes a sealing portion 82 and a bracket engaging portion 84. The sealing portion 82 includes an insert fastening member 74 integrally formed (i.e., molded) thereon, which is a hook-bearing material. The insert fastening member 74 accepts the complementary fastening member 36 of the tonneau cover 32, as shown in FIG. 1. The bracket engaging portion 84 accepts the bracket 50, as shown in FIG. 3.

Figure 8:
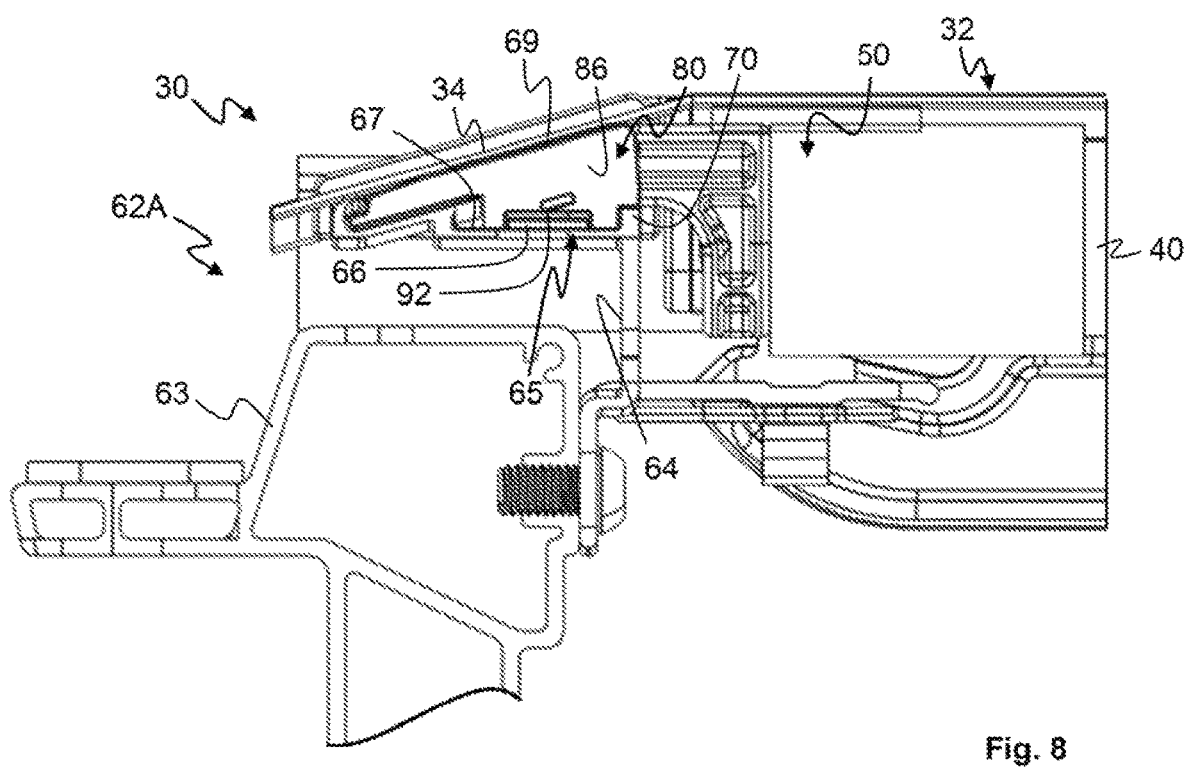
FIG. 8 is a cross-section view of the tonneau cover system along the line B-B, as shown in FIG. 2.

The insert 80 includes opposing support walls 86A, 86B located at longitudinal ends 85A, 85B of the insert 80. The support walls 86A, 86B prevent longitudinal movement of the bracket 50 and engage with the slot 67 of the frame rail 62A, as shown in FIG. 3. The insert 80 includes a rail engagement feature 92, which accepts an insert retaining feature 66 of the frame rail 62A, as shown in FIG. 8. The rail engagement feature 92 is a groove that extends between the longitudinal ends 85A, 85B of the insert 80. A complementary fit between the rail engagement feature 92 and the insert retaining feature 66 aids in correctly positioning the insert 80 in the slot 67, as shown in FIG. 3, and obviates transverse axial movement of the insert 80 with respect to the frame rail 62A. The insert 80 includes a locking member 88A, 88B (i.e., a boss), formed on the longitudinal ends 85A, 85B of the insert 80, which provides for a snap-fit with the frame rail 62A when the insert 80 is installed in the slot 67, as shown in FIG. 3.

Figure 6:
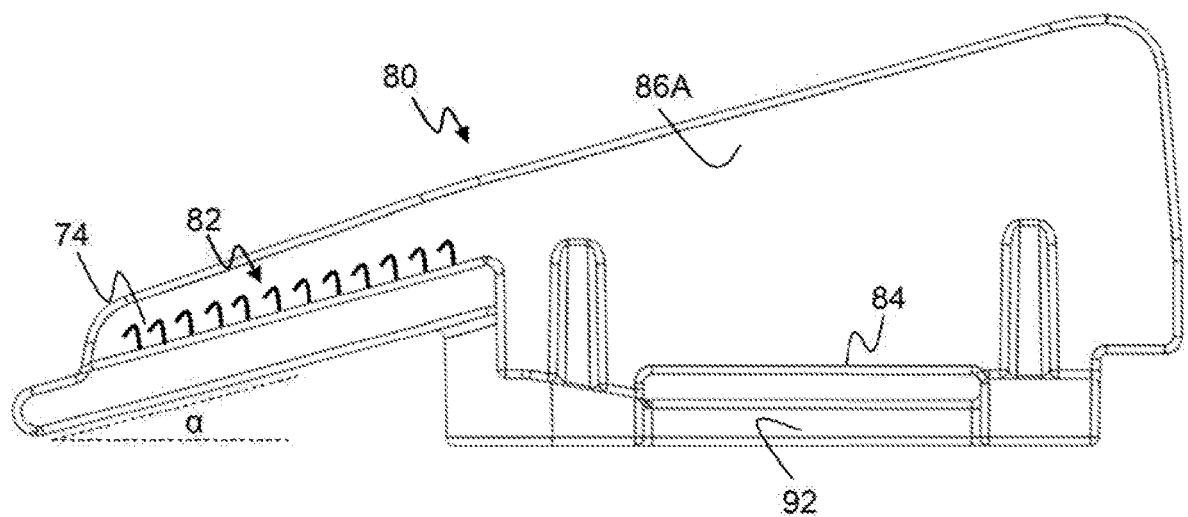
FIG. 6 is a cross-section view of the insert along the line D-D, as shown in FIG. 5.
Figure 9:
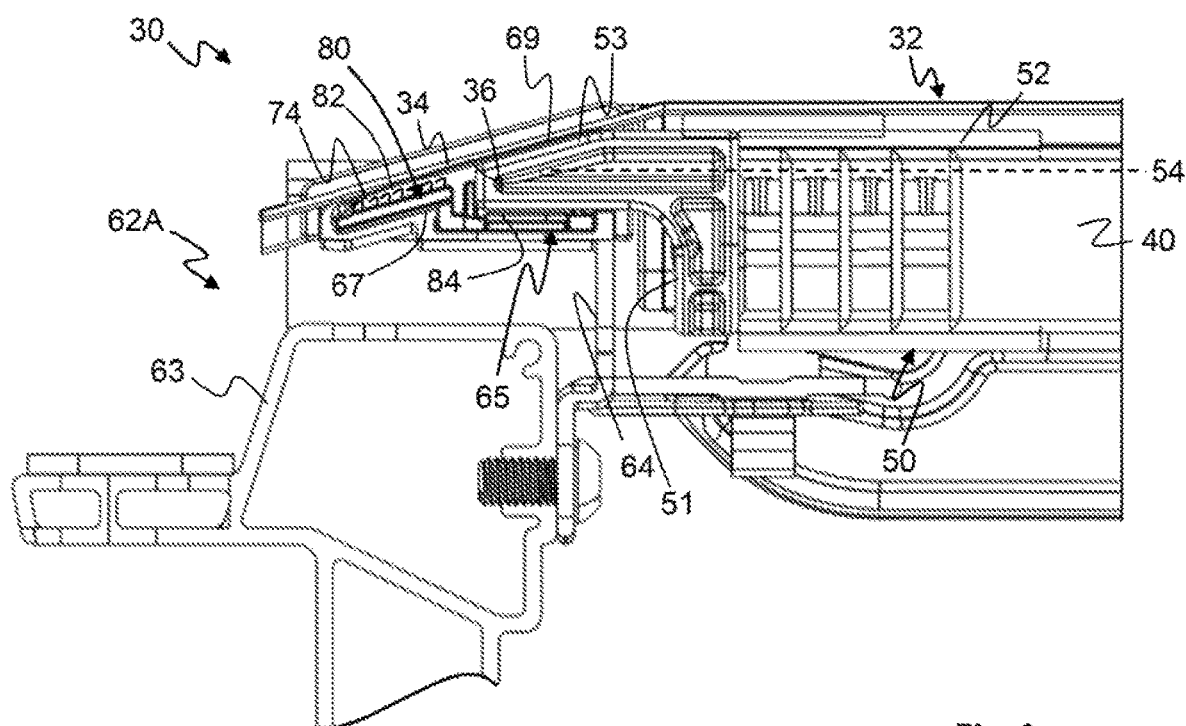
FIG. 9 is a cross-section view of the tonneau cover system along the line C-C, as shown in FIG. 3.

FIG. 6 shows a plan view of the insert 80 along the line D-D, as shown in FIG. 5. The insert 80 includes a sealing portion 82, a bracket engaging portion 84, and a support wall 86A extending along both the sealing portion 82 and the bracket engaging portion 84. The sealing portion 82 includes an insert fastening member 74. The sealing portion 82 extends toward the bracket engaging portion 84 at an angle α. The bracket engaging portion 84 is arranged below a precipice of the sealing portion 82. The bracket engaging portion 84 accepts the insert engaging portion 53 of the bracket 50 and provides for a substantially flush fit of the insert engaging portion 53 of the bracket 40 with a top surface 69 of the frame rail 62A, as shown in FIG. 9. The insert 80 includes a rail engagement feature 92, which forms a complementary fit with the insert retaining feature 66 of the frame rail 62A, as shown in FIG. 8.

FIG. 7 shows a plan view of the tonneau cover system 30 along the line A-A, as shown in FIG. 2. The tonneau cover system 30 includes a fame rail 62A, a cross-bow member 40, a bracket 50, and a tonneau cover 32. The frame rail 62A includes an outwardly facing portion 65 that locates atop a top surface 20 of a right-side side wall 18A, as shown in FIG. 3. A depending portion 64 extends downward from the outwardly facing portion 65 and is affixed to an under-rail portion 63 by a fastener. The outwardly facing portion 65 of the frame rail 62A includes a channel 71 defined by opposing curved surfaces 72A, 72B. A frame rail fastening member (e.g., hook-bearing material) 73 is located within the channel 71. The channel 71 and the opposing curved surfaces 72A, 72B define a top surface 69 of the outwardly facing portion 65. Opposing the top surface 69 of the outwardly facing portion 65 is a bottom surface 68 adapted to rest upon the right-side side wall 18A, as shown in FIG. 3. An inner surface 70 is located adjacent the top surface 69 and bottom surface 68.

The tonneau cover 32 extends over the cross-bow member 40, the bracket 50, and the outwardly facing portion 65. An edge 34 of the tonneau cover 32 extends over the channel 71 of the outwardly facing portion 65. The edge 34 includes a complementary fastening member (e.g., loop-bearing material) 36. The complementary fastening member 36 is fastened to the frame rail fastening member 73 located within the channel 71.

FIG. 8 shows a plan view of the tonneau cover system 30 along the line B-B, as shown in FIG. 2. The tonneau cover system 30 includes a fame rail 62A, a cross-bow member 40, a bracket 50, and a tonneau cover 32.

The frame rail 62A includes an outwardly facing portion 65 that locates upon a top surface 20 of a right-side side wall 18A, as shown in FIG. 3. A depending portion 64 extends downward from the outwardly facing portion 65 and is affixed to an under-rail portion 63 by a fastener.

The frame rail 62A includes an insert 80. The insert 80 is located within a slot 67 formed in the frame rail 62A. The slot 67 includes an insert retaining feature 66, which projects from the slot 67. A rail engagement feature 92, which is a groove extending longitudinally through the insert 80 accepts the insert retaining feature 66. The insert 80 fits substantially flush with the frame rail 62A so that a support wall 86 of the insert does not extend past the top surface 69 or the inner surface 70 of the outwardly facing portion 65.

The tonneau cover 32 extends over the cross-bow member 40, the bracket 50, and the outwardly facing portion 65. An edge 34 of the tonneau cover 32 extends over the support wall 86 of the insert 80.

FIG. 9 shows a plan view of the tonneau cover system 30 along the line C-C, as shown in FIG. 3. The tonneau cover system 30 includes a fame rail 62A, a cross-bow member 40, a bracket 50, and a tonneau cover 32.

The frame rail 62A includes an outwardly facing portion 65 that locates atop a top surface 20 of a right-side side wall 18A, as shown in FIG. 3. A depending portion 64 extends downward from the outwardly facing portion 65 and is affixed to an under-rail portion 63 by a fastener. The outwardly facing portion 65 includes a slot 67 formed therein. An insert 80 fits within the slot 67. The insert 80 includes a bracket engaging portion 84 and a sealing portion 82. The sealing portion 82 includes an insert fastening member (e.g., hook-bearing material) 74.

The bracket 50 includes a cross-bow member engaging portion 52, which is a female-type connector. The cross-bow member engaging portion 52 accepts the cross-bow member 40, which is a male-type connector. The bracket 50 further includes an insert engaging portion 53, which is a finger. The insert engaging portion 53 extends from a longitudinal end 51 of the bracket 50. The insert engaging portion 53 extends along a distal longitudinal axis 54 of the bracket 50. The insert engaging portion 53 is shown as a finger that extends into the frame rail 62A and rests upon the bracket engaging portion 84. The bracket engaging portion 84 is a shelf that extends a distance below the top surface 69 of the outwardly facing portion 65 so that the insert engaging portion 53 fits substantially flush with the top surface 69 of the outwardly facing portion 65, as shown in FIG. 7.

The tonneau cover 32 extends over the cross-bow member 40, the bracket 50, and the outwardly facing portion 65. The edge 34 includes a complementary fastening member (e.g., loop-bearing material) 36 facing the insert 80. The complementary fastening member 36 is fastened to the insert fastening member 74 located on the sealing portion 82.

REFERENCE NUMERALS

10 Vehicle
12 Cargo area
14 Bottom (i.e., "floor")
16 Open top
18A Right-side side wall (i.e., "side wall")
18B Left-side side wall (i.e., "side wall")
18C Front wall (i.e., "cab wall")
18D Backwall (i.e., "tailgate")
20 Top surface
CL Centerline (longitudinal axis)
30 Tonneau cover system
32 Tonneau cover
34 Edge
35 Outward impression
36 Complementary fastening member
38 Attachment member
40 Cross-bow member
42 Opposing end
50 Bracket
51 Longitudinal end
52 Cross-bow member engaging portion
53 Insert engaging portion (i.e., "finger")
54 Distal longitudinal axis
60 Frame rail assembly
61 Transverse axis
62 Frame rail
63 Under-rail portion
64 Depending portion
65 Outwardly facing portion
66 Insert retaining feature
67 Slot
68 Bottom surface
69 Top surface
70 Inner surface
71 Channel
72 Curved surface
73 Frame rail fastening member
74 Insert fastening member
80 Insert
82 Sealing portion
84 Bracket engaging portion
85 Longitudinal ends
86 Support wall
88 Locking member (i.e., "boss")
92 Rail engagement feature
94 Gap
α Angle Any numerical values recited in the above application include all values from the lower value to the upper value in increments of one unit provided that there is a separation of at least 2 units between any lower value and any higher value. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. A frame rail assembly for supporting a tonneau cover comprising:
a frame rail locatable on a cargo area of a vehicle, the frame rail having one or more slots formed therein; and
one or more inserts that fit within the one or more slots respectively, the one or more inserts comprising a sealing portion engageable with the tonneau cover;
wherein the sealing portion includes an insert fastening member, the insert fastening member being engageable with a complementary fastening member located on an edge of the tonneau cover;
wherein the one or more inserts of the frame rail assembly supports one or more cross-bow members extending from the frame rail and over the cargo area.

2. The frame rail assembly of claim 1, wherein the one or more inserts comprise:
a bracket engaging portion including a planar surface engageable with brackets and extending substantially between opposing ends of the bracket engaging portion;
wherein the opposing ends include a first end oriented toward a back wall of the cargo area and a second end oriented toward a front wall of the cargo area.

3. The frame rail assembly of claim 2, wherein the sealing portion is oriented at an angle of about 15° or more from top surfaces of the cargo area when the frame rail is located on the cargo area.

4. The frame rail assembly of claim 1, wherein the insert fastening member is a hook-bearing material and the complementary fastening member is a loop-bearing material, or vice versa.

5. The frame rail assembly of claim 1, wherein the one or more inserts include a rail engagement feature adapted to face the one or more slots; and
wherein the rail engagement feature is engageable with an insert retaining feature formed on the frame rail and facing the insert.

6. The frame rail assembly of claim 5, wherein the rail engagement feature is a groove and the insert retaining feature is a projection adapted to fit within the groove.

7. The frame rail assembly of claim 1, wherein the one or more inserts include locking members projecting from longitudinal ends of the one or more inserts, the locking members adapted to snap-fit into the frame rail.

8. The frame rail assembly of claim 1, wherein brackets are coupled to opposing ends of the one or more cross-bow members respectively, the brackets each comprising:
a cross-bow member engaging portion engageable with the one or more cross-bow members; and
an insert engaging portion removably engageable with the one or more inserts.

9. The frame rail assembly of claim 8, wherein the cross-bow member engaging portion is a slot that friction-fits with the one or more cross-bow members; and
wherein the insert engaging portion is a finger extending from a longitudinal end of the brackets.

10. A tonneau cover system for a cargo area of a vehicle, the tonneau cover system comprising:
opposing frame rails locatable on the cargo area of the vehicle, each of the opposing frame rails having one or more slots formed therein and the opposing frame rails comprising one or more inserts that fit within the one or more slots respectively;
one or more cross-bow members extending from one of the opposing frame rails to another of the opposing frame rails;
brackets coupled to opposing ends of the one or more cross-bow members, each of the brackets being removably engageable with the one or more inserts; and
a tonneau cover supported by the opposing frame rails, the brackets, and the one or more cross-bow members;
wherein the one or more inserts comprise a sealing portion engageable with the tonneau cover; and
wherein the sealing portion includes an insert fastening member, the insert fastening member being engageable with a complementary fastening member located on an edge of the tonneau cover.

11. The tonneau cover system of claim 10, wherein the one or more inserts comprise:
a bracket engaging portion including a planar surface engageable with the brackets and extending substantially between opposing ends of the bracket engaging portion;
wherein the opposing ends include a first end oriented toward a back wall of the cargo area and a second end oriented toward a front wall of the cargo area.

12. The tonneau cover system of claim 11, wherein the sealing portion is oriented at an angle of about 15° or more from top surfaces of the cargo area when the opposing frame rails are located on the cargo area.

13. The tonneau cover system of claim 11, wherein the bracket engaging portion is a shelf distanced below a top surface of the opposing frame rails to provide for a substantially flush fit of an insert engaging portion of the brackets with the top surface of the opposing frame rails when the brackets are engaged with the one or more inserts.

14. The tonneau cover system of claim 11, wherein the brackets each comprise:
a cross-bow member engaging portion engageable with the one or more cross-bow members; and
an insert engaging portion engageable with the one or more inserts.

15. The tonneau cover system of claim 14, wherein the cross-bow member engaging portion is a slot that friction-fits with the one or more cross-bow members;
wherein the insert engaging portion is a finger extending from a longitudinal end of the brackets; and
wherein an edge of the cross-bow member engaging portion is coplanar with an edge of the insert engaging portion.

16. The tonneau cover system of claim 14, wherein the bracket engaging portion is wider than the insert engaging portion so that one or more gaps are formed between the insert engaging portion and longitudinal ends of the one or more inserts when the brackets are engaged with the one or more inserts; and
wherein the one or more gaps provide for a tolerance for fitting the insert engaging portion with the bracket engaging portion.

17. The tonneau cover system of claim 10, wherein attachment members fasten the one or more cross-bow members, the brackets, or both to the tonneau cover so that the one or more cross-bow members are movable with the tonneau cover; and
wherein the attachment members are straps, loops, ties, or any combination thereof, the attachment members being adapted to wrap around the one or more cross-bow members, the brackets, or both.

18. The frame rail assembly of claim 1, wherein a width of the insert fastening member is less than a width of a frame rail fastening member.

19. The tonneau cover system of claim 8, wherein an edge of the cross-bow member engaging portion is coplanar with an edge of the insert engaging portion.

20. The frame rail assembly of claim 1, wherein the one or more inserts extend from an inboard edge of the frame rail to an outboard edge of the frame rail, relative to a centerline of the vehicle.

* * * * *